(12) United States Patent
Tahara et al.

(10) Patent No.: US 12,540,813 B2
(45) Date of Patent: Feb. 3, 2026

(54) WAFER THICKNESS MEASUREMENT DEVICE AND METHOD FOR SAME

(71) Applicant: KOBELCO RESEARCH INSTITUTE, INC., Kobe (JP)

(72) Inventors: Kazuhiko Tahara, Kobe (JP); Ryo Usaki, Kobe (JP)

(73) Assignee: KOBELCO RESEARCH INSTITUTE, INC., Kobe (JP)

( * ) Notice: Subject to any disclaimer, the term of this patent is extended or adjusted under 35 U.S.C. 154(b) by 166 days.

(21) Appl. No.: 18/699,330

(22) PCT Filed: Oct. 5, 2022

(86) PCT No.: PCT/JP2022/037257
§ 371 (c)(1),
(2) Date: Apr. 8, 2024

(87) PCT Pub. No.: WO2023/084952
PCT Pub. Date: May 19, 2023

(65) Prior Publication Data
US 2024/0401931 A1    Dec. 5, 2024

(30) Foreign Application Priority Data
Nov. 10, 2021    (JP) .................... 2021-183242

(51) Int. Cl.
*G01B 11/06* (2006.01)
(52) U.S. Cl.
CPC .................. *G01B 11/0691* (2013.01)
(58) Field of Classification Search
CPC ............ G01B 11/0691; G01B 11/0675; G01B 2210/44; G01B 2210/48; G01B 11/06;
(Continued)

(56) References Cited

U.S. PATENT DOCUMENTS

| 6,353,473 B1* | 3/2002 | Ishimori | G01B 11/06 356/485 |
| 7,212,291 B2* | 5/2007 | De Lega | G01B 9/02039 356/512 |

(Continued)

FOREIGN PATENT DOCUMENTS

JP    2000-234912 A    8/2000

OTHER PUBLICATIONS

International Search Report issued Dec. 13, 2022 in PCT/JP2022/037257, filed on Oct. 5, 2022, 2 pages.
(Continued)

*Primary Examiner* — Isiaka O Akanbi
(74) *Attorney, Agent, or Firm* — Oblon, McClelland, Maier & Neustadt, L.L.P.

(57) ABSTRACT

A wafer thickness measurement device of the present invention obtains, based on: first and second interferometer reference measurement results obtained by measuring, with an A-surface optical interferometer and a B-surface optical interferometer, a reference measurement point on a reference piece having the reference measurement point at which the reference piece has a known thickness; first and second distance meter reference measurement results obtained by measuring the reference measurement point with an A-surface distance meter and a B-surface distance meter; first and second interferometer measurement results obtained by measuring a measurement point of the wafer with the A-surface optical interferometer and the B-surface optical interferometer; and first and second distance meter measurement results obtained by measuring the measurement point with the A-surface distance meter and the B-surface distance meter, and obtains a thickness, of the wafer, at the measurement point.

5 Claims, 7 Drawing Sheets

(58) Field of Classification Search
CPC .... G01B 9/02; G01B 11/026; G01B 2210/56;
H01L 22/12; H01L 22/00
USPC .......... 356/503, 73, 485, 489, 511, 630, 631
See application file for complete search history.

(56) References Cited

U.S. PATENT DOCUMENTS

| | | | | |
|---|---|---|---|---|
| 9,995,570 | B2* | 6/2018 | Morley | G01B 9/02076 |
| 10,001,360 | B2* | 6/2018 | Kannaka | G01B 11/06 |
| 10,317,656 | B2* | 6/2019 | Dubois | G02B 21/0056 |
| 11,435,234 | B1* | 9/2022 | Keaveney | G01J 9/0246 |
| 2015/0153163 | A1* | 6/2015 | Dresel | G01B 11/2441 |
| | | | | 356/511 |
| 2015/0176973 | A1* | 6/2015 | Tang | G01B 11/06 |
| | | | | 356/503 |
| 2018/0364028 | A1* | 12/2018 | Piel | G01B 9/02044 |
| 2021/0302151 | A1* | 9/2021 | Chen | G01B 9/02057 |
| 2021/0318610 | A1* | 10/2021 | Shudo | G01B 21/045 |
| 2023/0236006 | A1* | 7/2023 | May | G01M 11/0271 |
| | | | | 356/503 |

OTHER PUBLICATIONS

Extended European Search Report issued Feb. 5, 2025 in European Patent Application No. 22892452.8, 6 pages.

\* cited by examiner

WAFER THICKNESS MEASUREMENT DEVICE AND METHOD FOR SAME

TECHNICAL FIELD

The present invention relates to a wafer thickness measurement device and a wafer thickness measurement method for measuring a thickness of a wafer.

BACKGROUND ART

For example, in recent years, a wafer serving as a substrate of a magnetic disk, a material for an integrated circuit, or the like has been required to have high flatness for higher recording density, higher integration of circuits, or the like. For example, with respect to integrated circuits, a 7 nm design rule and 5 nm design have been achieved. In order to obtain such a flatness, it is necessary to measure the thickness of a wafer with high accuracy in the order of, for example, 10 nanometers or less. A wafer thickness measurement device that measures such a thickness of wafer is disclosed in, for example, Patent Literature 1.

The wafer thickness measurement device disclosed in Patent Literature 1 is a device for measuring, with an optical heterodyne interference measurement device, a thickness of a wafer, and the wafer thickness measurement device includes: a sample piece that is disposed to correspond to a height position of the wafer and to be inclined by a predetermined angle that substantially corresponds to an inclination angle of the wafer caused by deflection of the wafer, the sample piece having a known uniform thickness equivalent to the wafer; a first detector that generates a detection signal according to a distance from a predetermined reference position on a front surface side of the wafer to a front surface position, of the wafer, corresponding to a measurement point of the optical heterodyne interference measurement device; and a second detector that generates a detection signal according to a distance from a predetermined reference position on a back surface side of the wafer to a back surface position, of the wafer, corresponding to a measurement point of the optical heterodyne interference measurement device; and data collecting/storing means that measures a displacement amount of the front surface or the back surface of the sample piece with the optical heterodyne interference measurement device at a large number of measurement points, and stores detection values detected by the detection signals of the first and second detectors obtained at the measurement points, in correspondence to the displacement amounts of the measurement points. The wafer thickness measurement device obtains each of detection values detected by the detection signals of the first and second detectors at any measurement point of the wafer whose front and back surfaces are in a height range of the front and back of the sample piece; from each of the detection values, each of the displacement amounts corresponding to the detection values that are stored by the data collecting/storing means and are measured by the optical heterodyne interference measurement device is obtained; and the thickness of the wafer is calculated based on the obtained each of the displacement amounts and the thickness of the sample piece.

Meanwhile, according to the descriptions such as paragraph and paragraph [0007], the wafer thickness measurement device disclosed in Patent Literature 1 obtains the thickness of a wafer to be measured by adding or subtracting the amounts of the displacements of the front surface and the rear surface from the thickness of a sample piece, having a uniform thickness, serving as a reference. Therefore, the measurement accuracy in the wafer thickness measurement device disclosed in Patent Literature 1 depends on the uniformity of the thickness of the sample piece. In order to measure the thickness of a wafer with high accuracy, a sample piece having high accuracy and a uniform thickness is required, and the wafer thickness measurement device disclosed in Patent Literature 1 does not make full use of the performance of the optical interferometer (an optical heterodyne interferometer in Patent Literature 1).

CITATION LIST

Patent Literature

Patent Literature 1: JP 2000-234912 A

SUMMARY OF INVENTION

The present invention has been made in view of the above-described circumstances, and an object of the invention is to provide a wafer thickness measurement device and a wafer thickness measurement method capable of measuring the thickness of a wafer with high accuracy by utilizing performance of an optical interferometer.

A wafer thickness measurement device and a wafer thickness measurement method of the present invention obtain, based on: first and second interferometer reference measurement results obtained by measuring, with an A-surface optical interferometer and a B-surface optical interferometer, a reference measurement point on a reference piece having the reference measurement point at which the reference piece has a known thickness; first and second distance meter reference measurement results obtained by measuring the reference measurement point with an A-surface distance meter and a B-surface distance meter; first and second interferometer measurement results obtained by measuring a measurement point of the wafer with the A-surface optical interferometer and the B-surface optical interferometer; and first and second distance meter measurement results obtained by measuring the measurement point with the A-surface distance meter and the B-surface distance meter, a number of phases between a reference displacement based on the first and second interferometer reference measurement results and a displacement based on the first and second interferometer measurement results, and obtains a thickness, of the wafer, at the measurement point.

The above and other objects, features, and advantages of the present invention will be apparent from the following detailed description and accompanying drawings.

DESCRIPTION OF EMBODIMENTS

Figure 1:
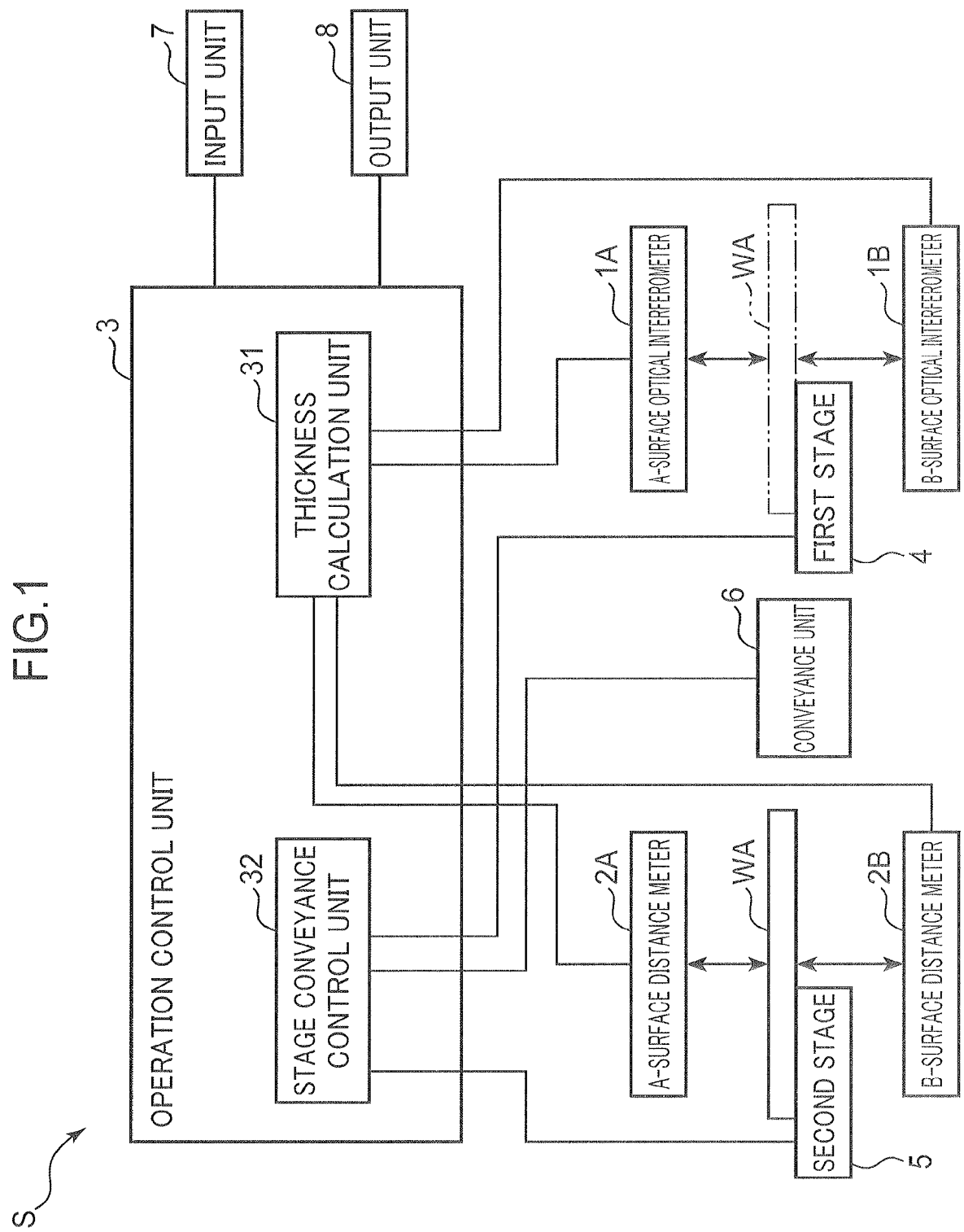
FIG. 1 is a block diagram illustrating a configuration of a wafer thickness measurement device according to an embodiment.

Hereinafter, one or a plurality of embodiments of the present invention will be described with reference to the drawings. However, the scope of the invention is not limited to the disclosed embodiments. Note that in the drawings, the same reference signs denote the same components, and description thereof will be appropriately omitted. In the present specification, when components are collectively referred to, the components will be denoted by reference signs with suffixes omitted, and when components are individually referred to, the components will be denoted by reference signs with suffixes.

The wafer thickness measurement device in the embodiment is a device that mainly includes an optical interferometer capable of performing high accuracy measurement and that measures, for example, the thickness of a wafer such as a substrate of a magnetic disk or a material for an integrated circuit. The wafer thickness measurement device includes: a pair of first and second optical interferometers disposed to face each other with a measurement target wafer interposed between the first and second optical interferometers; a pair of first and second distance meters that are disposed to face each other with the measurement target wafer interposed between the first and second distance meters and that measure absolute distances; and a thickness calculation unit that obtains, based on: first and second interferometer reference measurement results obtained by measuring, with the first and second optical interferometers, a reference measurement point on a reference piece having the reference measurement point at which the reference piece has a known thickness; first and second distance meter reference measurement results obtained by measuring the reference measurement point with the first and second distance meters; first and second interferometer measurement results obtained by measuring a measurement point on the measurement target wafer with the first and second optical interferometers; and first and second distance meter measurement results obtained by measuring the measurement point with the first and second distance meters, a number of phases between a reference displacement obtained based on the first and second interferometer reference measurement results and a displacement obtained based on the first and second interferometer measurement results, and obtains a thickness, of the measurement target wafer, at the measurement point. Hereinafter, such a wafer thickness measurement device and a wafer thickness measurement method mounted on the wafer thickness measurement device will be described more specifically.

Figure 2:
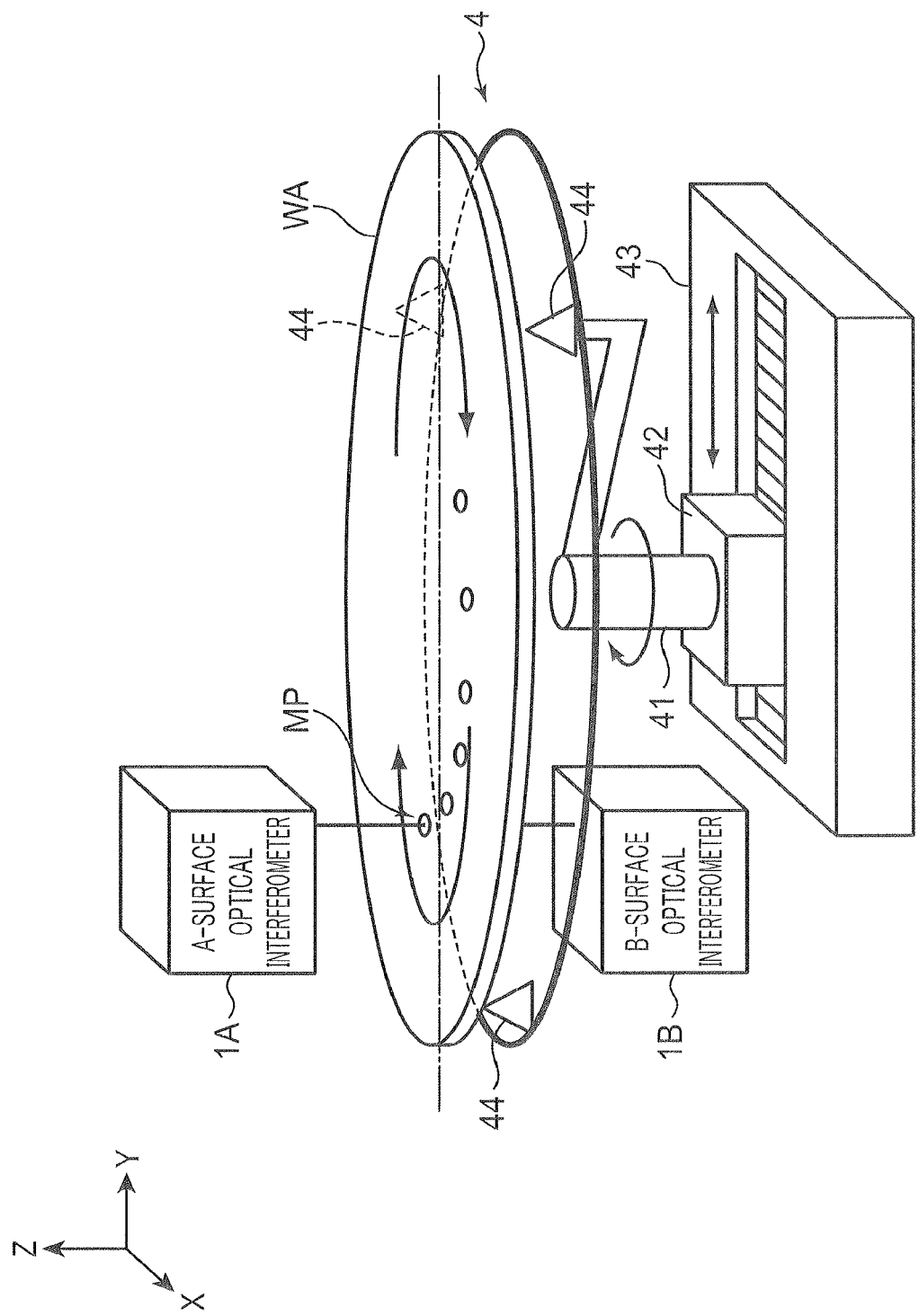
FIG. 2 is a schematic diagram illustrating a configuration of a first stage in the wafer thickness measurement device.
Figure 3:
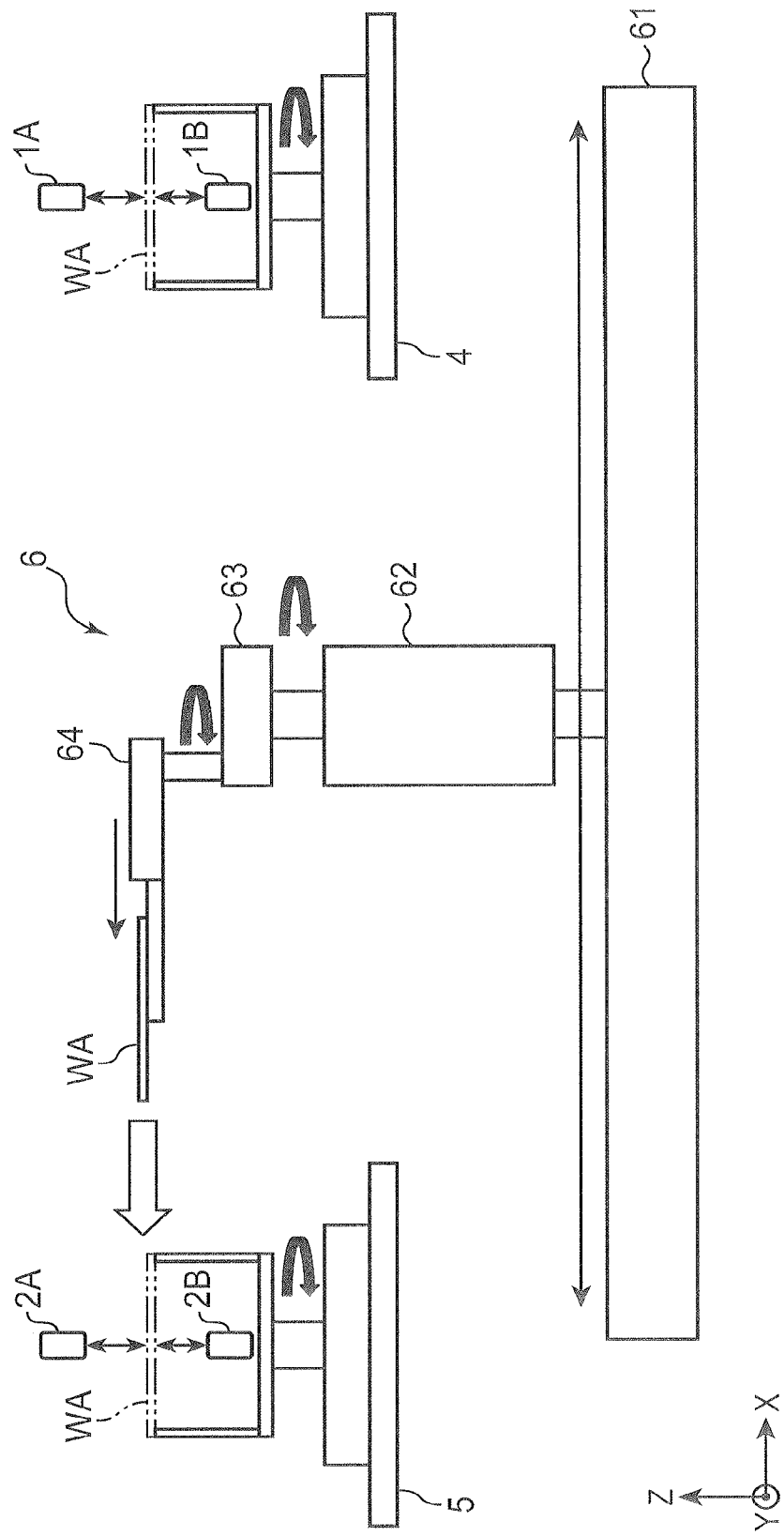
FIG. 3 is a schematic diagram illustrating a configuration of a conveyance unit in the wafer thickness measurement device.
Figure 4:
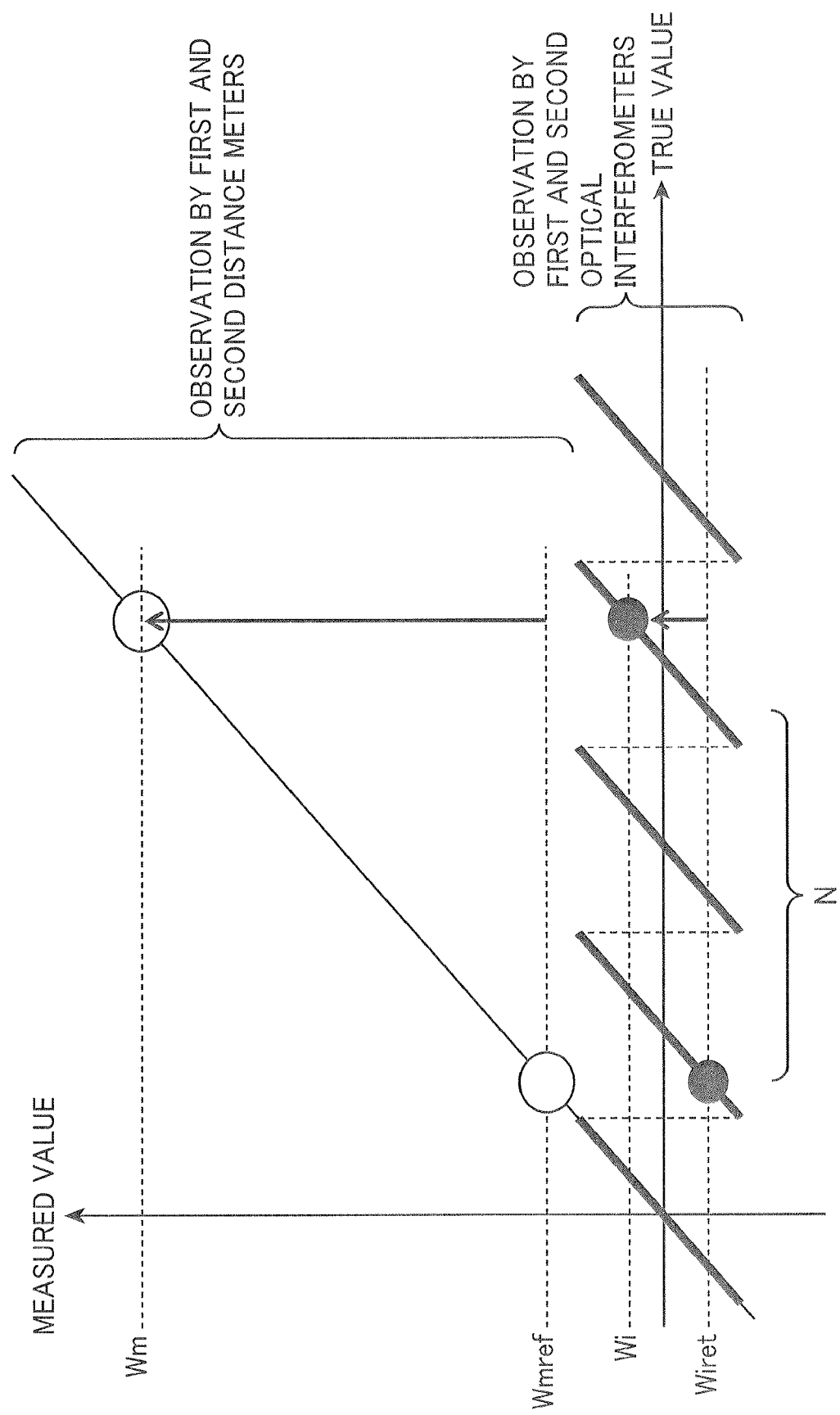
FIG. 4 is a diagram for describing a thickness calculation method in the wafer thickness measurement device.

FIG. 1 is a block diagram illustrating a configuration of the wafer thickness measurement device according to an embodiment. FIG. 2 is a schematic diagram illustrating a configuration of a first stage in the wafer thickness measurement device. FIG. 3 is a schematic diagram illustrating a configuration of a conveyance unit in the wafer thickness measurement device. FIG. 4 is a diagram for describing a thickness calculation method in the wafer thickness measurement device.

Note that, for convenience of description, one surface (one main surface) of a measurement target wafer WA is appropriately referred to as an A surface, and the other surface (the other main surface and the flip side of the A surface) of the wafer WA is appropriately referred to as a B surface. In the example illustrated in FIGS. 1 to 3, in a case where the wafer WA is placed on the first or second stage 4 or 5, the A surface is the upper surface, and the B surface is the lower surface.

As illustrated in FIG. 1, a wafer thickness measurement device S in the embodiment includes, for example: an A-surface optical interferometer 1A; a B-surface optical interferometer 1B; an A-surface distance meter 2A; a B-surface distance meter 2B; an operation control unit 3; a first stage 4; a second stage 5; a conveyance unit 6; an input unit 7; and an output unit 8.

As illustrated in FIGS. 1 to 3, the A-surface optical interferometer 1A and the B-surface optical interferometer 1B are optical interferometers disposed to face each other with the measurement target wafer WA interposed therebetween. That is, the A-surface optical interferometer 1A is disposed to face an A surface of the wafer WA, the B-surface optical interferometer 1B is disposed to face a B surface of the wafer WA, and the A-surface optical interferometer 1A and the B-surface optical interferometer 1B are disposed so as to measure the same measurement point on the front and back of the wafer WA. An optical interferometer related to thickness measurement causes two coherent first and second light beams to propagate through first and second optical paths and, then, causes the first and second light beams to interfere with each other to obtain a first-and-second optical path length difference on the basis of a phase difference generated according to the difference between a first optical path length of the first optical path and a second optical path length of the second optical path. The optical interferometer detects a thickness change amount (displacement amount) of the measurement target as the first-and-second optical path length difference by using the first light beam as reference light, using the second light beam as measurement light, setting the first and second optical path length to be equal when no measurement target is on the second optical path, disposing a measurement target in the second optical path, whereby the optical interferometer measures the thickness change amount of the measurement target. As such an optical interferometer, for example, there are known various devices such as an optical heterodyne interferometer, an optical homodyne interferometer, and a Fizeau optical interferometer. The optical heterodyne interferometer causes two laser beams having different frequencies to interfere to generate a beat signal having a frequency corresponding to the difference between the frequencies of the two laser beams, and the optical heterodyne interferometer detects a phase change of the generated beat signal. The phase change of the beat signal corresponds to the difference of an optical path between the two laser beams and therefore is related to a thickness change amount (displacement amount) of the measurement target. A device related to thickness measurement using such an optical heterodyne interferometer is disclosed in, for example, JP 2008-180708 A and JP 2019-168339 A. In the optical homodyne interferometer, as compared with the optical heterodyne interferometer, a laser beam from the same light source is divided into two beams by, for example, a beam splitter so as to have the same frequency, one beam is used as reference light, and the other beam is used as measurement light. A device related to thickness measurement using such an optical homodyne interferometer is disclosed in, for example, JP 2010-197376 A. In the Fizcau optical interferometer, measurement light is divided into first measurement light (reference light) that propagates through a first optical path and is reflected by a reference plane and second measurement light that propagates through a second optical path and is reflected by a surface of a measurement target, and the first measurement light reflected by the reference plane and the second measurement light reflected by the surface of the measurement target are made to interfere with each other. A device related to thickness measurement using such a Fizeau interferometer is disclosed in, for example, JP 2016-095276 A and JP 2016-176784 A.

In the present embodiment, an optical heterodyne interferometer is used as each of the A-surface optical interferometer 1A and the B-surface optical interferometer 1B. Each of the A-surface optical interferometer 1A and the B-surface optical interferometer 1B is connected to the operation control unit 3, performs measurement under control of the operation control unit 3, and outputs a measurement result to the operation control unit 3.

As illustrated in FIGS. 1 to 3, the A-surface distance meter 2A and the B-surface distance meter 2B are distance meters disposed to face each other with a measurement target wafer WA interposed therebetween, and measure absolute distances. That is, the A-surface distance meter 2A is disposed to face the A surface of the wafer WA, the B-surface distance meter 2B is disposed to face the B surface of the wafer WA, and the A-surface distance meter 2A and the B-surface distance meter 2B are disposed so as to measure the same measurement point on the front and back of the wafer WA. As such a distance meter, for example, there is used a capacitance sensor, a confocal sensor, a triangulation sensor, a spectral interference laser displacement meter, or the like. The A-surface distance meter 2A is connected to the operation control unit 3, measures the distance from a disposition position of the A-surface distance meter 2A to the A surface of the wafer WA under the control of the operation control unit 3, and outputs a measurement result to the operation control unit 3. The B-surface distance meter 2 is connected to the operation control unit 3, measures the distance from a disposition position of the B-surface distance meter 2B to the B surface of the wafer WA under the control of the operation control unit 3, and outputs a measurement result to the operation control unit 3. A thickness T of the wafer WA at the measurement point is obtained by subtracting the distance La to the A surface of the wafer WA measured by the A-surface distance meter 2A and the distance Lb to the B surface of the wafer WA measured by the B-surface distance meter 2B from the distance Lab between the disposition position of the A-surface distance meter 2A and the disposition position of the B-surface distance meter 2B (T=Lab−(La+Lb)).

The first stage 4 is a device that is connected to the operation control unit 3 and moves the wafer WA in the horizontal direction orthogonal to the thickness direction of the measurement target wafer WA under control of the operation control unit 3. The first stage 4 may be an XY stage that can move the wafer WA in the X-axis direction and the Y-axis direction when an XYZ orthogonal coordinate system in which the thickness direction of the wafer WA is in the Z-axis direction is set. However, when the wafer WA is a semiconductor wafer, the semiconductor wafer generally has a disk shape; therefore, in the present embodiment, the first stage 4 is a device that can rotationally move the wafer WA and can move the wafer WA also in the radial direction of the rotation.

More specifically, for example, as illustrated in FIG. 2, the first stage 4 includes three arm members extending in the radial direction from a central member so as to be able to measure the thickness of the wafer WA at a measurement point MP with high accuracy and at a high speed without being affected by a vibration of the wafer WA; a support portion 44 that supports, at the tips of the arm members, the wafer WA at three points on its circumference at the edge part (edge region) of the wafer WA; a rotation shaft 41 connected to the central member of the support portion 44; a rotation drive unit 42 that rotationally drives the rotation shaft 41; and a linear drive unit 43 that linearly moves the rotation drive unit 42 within a predetermined movement range. The rotation drive unit 42 and the linear drive unit 43 are configured to include, for example, an actuator such as a servo motor and a drive mechanism such as a reduction gear.

In the first stage 4 having such a configuration, the wafer WA is three-point supported by the support portion 44, being placed on a tip of each of the three arm members in the support portion 44. Then, the first stage 4 is disposed with respect to the disposition positions of the A-surface optical interferometer 1A and the B-surface optical interferometer 1B so that the A surface and the B surface of the wafer WA can be measured by the A-surface optical interferometer 1A and the B-surface optical interferometer 1B when the wafer WA is placed on the first stage 4 as described above.

In the first stage 4 having such a configuration, the rotation drive unit 42 rotates under the control of the operation control unit 3, whereby the support portion 44 rotates via the rotation shaft 41, and the wafer WA rotates about the rotation shaft 41 (the central member of the support portion 44). Furthermore, the linear drive unit 43 linearly moves the rotation drive unit 42 under the control of the operation control unit 3 whereby the wafer WA moves along the radial direction. By using both the rotational movement of the wafer WA by the rotation drive unit 42 and the movement of the wafer WA in the linear direction by the linear drive unit 43, it is possible to measure a desired measurement point MP on the wafer WA within the movement range of the first stage 4.

The second stage 5 is a device that is connected to the operation control unit 3 and moves the wafer WA in the horizontal direction orthogonal to the thickness direction of the measurement target wafer WA under the control of the operation control unit 3, and is configured, in the present embodiment, similarly to the first stage 4. The second stage 5 is disposed with respect to the disposition positions of the A-surface distance meter 2A and the B-surface distance meter 2B so that the A surface and the B surface of the wafer WA can be measured by the A-surface distance meter 2A and the B-surface distance meter 2B when the wafer WA is placed on the second stage 5.

The conveyance unit 6 is a device that is connected to the operation control unit 3 and conveys the measurement target wafer WA between the first and second stages 4 and 5 under the control of the operation control unit 3. More specifically, as illustrated in FIG. 3, for example, the conveyance unit 6 is constituted by a conveyance robot 6 including: an arm unit 64 that grasps the measurement target wafer WA; a first rotation unit 63 that rotationally moves the arm unit 64 in the XY plane; a second rotation unit 62 that rotationally moves the first rotation unit 63 in the XY plane; and a transfer unit 61 that transfers the second rotation unit 62 between the first and second stages 4 and 5.

The input unit 7 is a device that is connected to the operation control unit 3 and inputs, to the wafer thickness measurement device S, various commands such as a command for instructing the start of thickness measurement, and various types of data necessary for causing the wafer thickness measurement device S to operate such as a name (for example, serial number) of the measurement target wafer WA, and the input unit 7 includes, for example, a plurality of input switches to which predetermined functions are assigned, a keyboard, a mouse, and the like. The output unit 8 is a device that is connected to the operation control unit 3 and outputs a command and data that are input from the input unit 7, a measurement result, and the like under the control of the operation control unit 3, and the output unit 8 includes, for example, a display device such as a CRT display, a liquid crystal display, and an organic EL display, a printing device such as a printer, and the like.

Note that the input unit 7 and the output unit 8 may constitute a so-called touch panel. When the touch panel is constituted, the input unit 7 is a position input device that is of a resistance film type or a capacitive type, for example, and detects and inputs an operation position, and the output unit 8 is a display device. In this touch panel, the position input device is provided on a display surface of the display device, and one or a plurality of input content candidates that can be input are displayed on the display device. When a user touches a display position where an input content desired to be input is displayed, the position input device detects the touched position, and the display content displayed at the detected position is input to the wafer thickness measurement device S as a user's operation input content. In such a touch panel, since the user can easily intuitively understand the input operation, the wafer thickness measurement device S that is easy for the user to handle is provided.

The operation control unit 3 is a circuit that controls the units of the wafer thickness measurement device S, based on the respective functions of the units, and the operation control unit 3 is configured with, for example: a read only memory (ROM), which is a nonvolatile storage element, and an electrically erasable programmable read only memory (EEPROM), which is rewritable, the ROM and the EEPROM storing various predetermined programs such as a control program for controlling the units of the wafer thickness measurement device S based on the respective functions of the units and a calculation program for obtaining the thickness of the wafer WA based on outputs of the A-surface optical interferometer 1A, the B-surface optical interferometer 1B, the A-surface distance meter 2A, and the B-surface distance meter 2B; a central processing unit (CPU) that reads and executes the predetermined program to perform a predetermined calculation processing and storing various types of predetermined data such as data necessary for executing the predetermined program; and a central processing unit (CPU) that performs predetermined arithmetic processing and control processing; a random access memory (RAM) serving as a so-called working memory of the CPU that stores data and the like generated during execution of the predetermined program; a microcomputer including these peripheral circuits; and the like. The operation control unit 3 functionally includes a thickness calculation unit 31 and a stage conveyance control unit 32.

The stage conveyance control unit 32 controls, in order to measure a plurality of measurement points MP on the wafer WA, operation of each of the rotation drive unit 42 and the linear drive unit 43 on the first stage 4 such that the wafer WA is moved in the horizontal direction orthogonal to the thickness direction, controls each of the units 61 to 64 of the conveyance unit 6 such that the wafer WA is conveyed between the first and second stages 4 and 5, and controls, in order to measure a plurality of measurement points MP on the wafer WA, operation of each of the rotation drive unit and the linear drive unit of the second stage 5 such that the wafer WA is conveyed in the horizontal direction orthogonal to the thickness direction.

The thickness calculation unit 31 obtains, based on: first and second interferometer reference measurement results obtained by measuring, with the A-surface optical interferometer 1A and the B-surface optical interferometer 1B, a reference measurement point on a reference piece having the reference measurement point at which the reference piece has a known thickness; first and second distance meter reference measurement results obtained by measuring the reference measurement point with the A-surface distance meter 2A and the B-surface distance meter 2B; first and second interferometer measurement results obtained by measuring a measurement point on the measurement target wafer WA with the A-surface optical interferometer 1A and the B-surface optical interferometer 1B; and first and second distance meter measurement results obtained by measuring the measurement point with the A-surface distance meter 2A and the B-surface distance meter 2B, a number of phases between a reference displacement obtained based on the first and second interferometer reference measurement results and a displacement obtained based on the first and second interferometer measurement results, and obtains a thickness, of the measurement target wafer WA, at the measurement point.

More specifically, as illustrated in FIG. 4, the thickness T of the wafer WA is obtained. FIG. 4 shows the reference thickness Wmref obtained based on the first and second distance meter reference measurement results obtained by measuring the reference measurement point that the reference piece has and at which the reference piece has a known thickness with the A-surface distance meter 2A and the B-surface distance meter 2B, and the thickness Wm obtained based on the first and second distance meter measurement results obtained by measuring the measurement point on the measurement target wafer WA with the A-surface distance meter 2A and the B-surface distance meter 2B. As described above, the reference thickness Wmref is obtained by subtracting a distance to the A surface of the wafer WA measured by the A-surface distance meter 2A (the first distance meter reference measurement result) and a distance to the B surface of the wafer WA measured by the B-surface distance meter 2B (the second distance meter reference measurement result) from a distance between the disposition position of the A-surface distance meter 2A and the disposition position of the B-surface distance meter 2B. Similarly, the thickness Wm is obtained by subtracting a distance to the A surface of the wafer WA measured by the A-surface distance meter 2A (the first distance meter measurement result) and a distance to the B surface of the wafer WA measured by the B-surface distance meter 2B (the second distance meter measurement result) from a distance between the disposition position of the A-surface distance meter 2A and the disposition position of the B-surface distance meter 2B. Similarly, FIG. 4 shows the reference displacement Wiref obtained based on the first and second interferometer reference measurement results obtained by measuring the reference measurement point with the A-surface optical interferometer 1A and the B-surface optical interferometer 1B, and the displacement Wi obtained based on the first and second interferometer measurement results obtained by measuring the measurement point with the A-surface optical interferometer 1A and the B-surface optical interferometer 1B. In the displacement measurement using an optical heterodyne interferometer, when assuming: a beat signal intensity of the measurement light is Is; a beat signal intensity of the reference light is Ir; frequencies of the two laser beams are respectively f1 and f2; a phase difference between the beat signal of the measurement light and the beat signal of the reference light is $\phi$; a wavelength of the reference light is $\lambda s$; and a displacement between the optical heterodyne interferometer and a measurement target is z, the following Formulas 1 to 4 hold, and the displacement z is obtained. Here, the beat signal of the measurement light and the beat signal of the reference light are generated by interference of light of frequency f1 and light of frequency f2, and the light of frequency f1 and the light of frequency f2 are generated by modulating the reference light of the wavelength $\lambda s$. In addition, after the light of frequency f1 and light of frequency f2 are generated, the reference light is generated by causing the light of frequency f1 and light of frequency f2 to directly interfere, and the measurement light is light generated by interference of any one of the light of frequency f1 and light of frequency f2 having passed a light path reflected by the wafer surface.

$$Is \propto I_0 \times \cos(\Delta \omega t - \phi) \qquad \text{Formula 1}$$

$$Ir \propto I_0 \times \cos(\Delta \omega t) \qquad \text{Formula 2}$$

$$\Delta \omega = 2\pi |f1 - f2| \qquad \text{Formula 3}$$

$$\phi = (4\pi/\lambda s) \times z \qquad \text{Formula 4}$$

The reference displacement Wiref and the displacement Wi illustrated in FIG. 4 were each obtained by the phase $\phi$ in the above Formula 4 being added with respect to the A-surface optical interferometer 1A and the B-surface optical interferometer 1B, being normalized in the range of 0 to $2\pi$, and being further multiplied by $\lambda s/4\pi$ to be converted into the displacement z.

The sizes of the circles (○, •) representing respective ones of the reference thickness Wmref, the thickness Wm, the reference displacement Wiref, and the displacement Wi symbolically represent the measurement accuracy. The measurement accuracy of the displacement measured by the A-surface optical interferometer 1A and the B-surface optical interferometer 1B is higher than the measurement accuracy of the thickness measured by the A-surface distance meter 2A and the B-surface distance meter 2B. For example, the measurement accuracy of the thickness measured by the A-surface distance meter 2A and the B-surface distance meter 2B is about 10 nm, and the measurement accuracy of the displacement measured by the A-surface optical interferometer 1A and the B-surface optical interferometer 1B is about 1 nm.

In the optical interferometer, when assuming the wavelength of the measurement light is $\lambda$ (for example, the wavelength $\lambda$ of helium neon laser light=632.8 nm), the measurement can be performed only in the range of $\pm\lambda/4$ (in the above, for example, $\pm 158.2$ nm). Therefore, even when the different wafers WA having thicknesses of $\lambda/2$ or more are measured, the measurement results are in the range of $\pm\lambda/4$ as illustrated in FIG. 4. For this reason, in the case of measurement of displacement using the optical interferometer, a thickness of a certain point is measured, and optical phase connection is performed, whereby a relative displacement beyond the range of $\pm\lambda/4$ is obtained with the certain point as a reference. In the present embodiment, as can be seen from FIG. 4, the following Formula 5 holds, when assuming a number of phases between the reference displacement Wiref obtained based on the first and second interferometer reference measurement results and the displacement Wi obtained based on the first and second interferometer measurement results is an integer N, and an error between the measurement result obtained by the A-surface optical interferometer 1A and the B-surface optical interferometer 1B and the measurement result obtained by the A-surface distance meter 2A and the B-surface distance meter 2B is $\varepsilon$.

$$|\varepsilon| = Wm - Wmref - ((Wi - Wiref) + N \times (\lambda/2)) \qquad \text{Formula 5}$$

Therefore, when the measurement accuracy of the A-surface distance meter 2A and the B-surface distance meter 2B is ½ or less with respect to $\lambda/4$, the number N of phases is obtained by obtaining the integer N that minimizes Wm–Wmref–((Wi–Wiref)+N×($\lambda/2$)). When the number N of phases is obtained, the thickness T of the measurement target wafer WA at the measurement point is obtained by the following Formula 6, assuming the known thickness is W0.

$$T = ((Wi - Wiref) + N \times (\lambda/2)) + W0 \qquad \text{Formula 6}$$

Here, by using a reference piece having a reference measurement point at which the reference piece has a known thickness, the thickness T of the wafer WA can be obtained according to the above Formula 6 without being affected by the measurement accuracy of the A-surface distance meter 2A and the B-surface distance meter 2B, and the thickness T can be measured with the measurement accuracy of the A-surface optical interferometer 1A and the B-surface optical interferometer 1B. However, as can be seen from the above-described calculation method, the measurement accuracy of the A-surface distance meter 2A and the B-surface distance meter 2B is removed when obtaining the number N of phases. Therefore, the reference piece may be the measurement target wafer, the reference measurement point may be a predetermined point on the measurement target wafer, the known thickness W0 may be the reference thickness Wmref, and the thickness T of the wafer WA may be obtained by the following Formula 7. Also in this case, the thickness T of the wafer WA can be obtained without being affected by the measurement accuracy of the A-surface distance meter 2A and the B-surface distance meter 2B, and can be measured with the measurement accuracy of the A-surface optical interferometer 1A and the B-surface optical interferometer 1B.

$$T = ((Wi - Wiref) + N \times (\lambda/2)) + Wmref \qquad \text{Formula 7}$$

Note that the A-surface optical interferometer 1A and the B-surface optical interferometer 1B correspond to an example of a pair of first and second optical interferometers disposed to face each other with a measurement target wafer interposed therebetween, and the A-surface distance meter 2A and the B-surface distance meter 2B correspond to an example of a pair of first and second distance meters disposed to face each other with a measurement target wafer interposed therebetween to measure an absolute distance.

Figure 5:
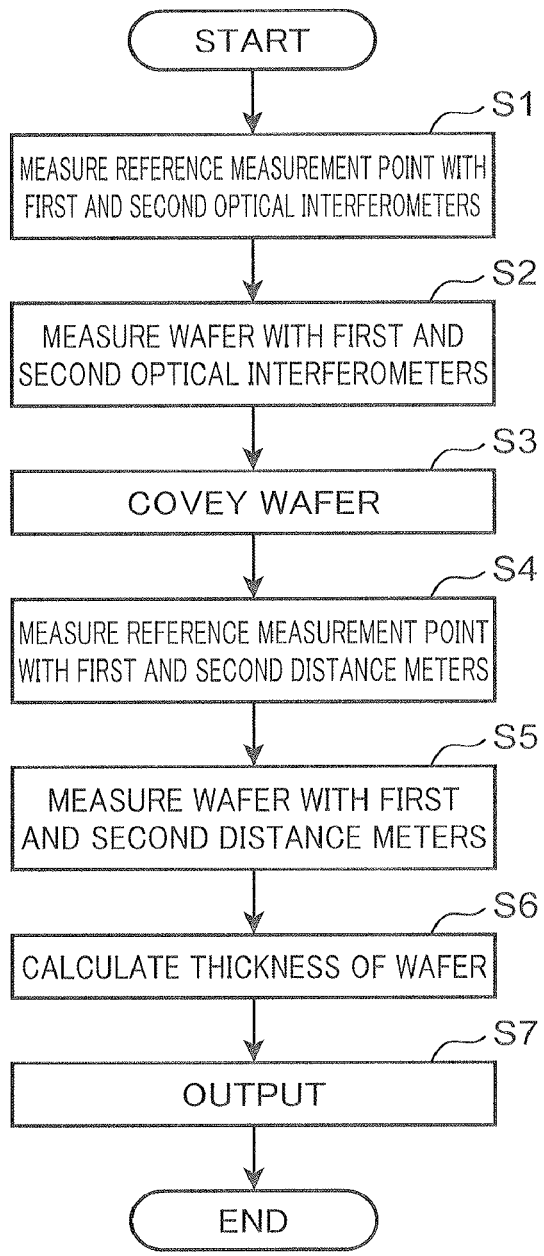
FIG. 5 is a flowchart illustrating operation of the wafer thickness measurement device.

Next, operation of the present embodiment will be described. FIG. 5 is a flowchart illustrating operation of the wafer thickness measurement device.

For example, when a power switch (not illustrated) is turned on, the wafer thickness measurement device S is activated, necessary units are initialized by an operation control unit 3, and the thickness calculation unit 31 and the stage conveyance control unit 32 are functionally configured in the operation control unit 3.

In the wafer thickness measurement device S according to the embodiment, the measurement using the A-surface optical interferometer 1A and the B-surface optical interferometer 1B and the measurement using the A-surface distance meter 2A and the B-surface distance meter 2B need to be performed with respect to the measurement point MP at the same position. Therefore, positioning is accurately performed before measurement. First, in the positioning in the XY direction, mechanical adjustment is performed such that each of measurement spots (an irradiation place (irradiation position) of measurement light) of the A-surface optical interferometer 1A and the B-surface optical interferometer 1B is positioned at the center of the first stage 4. Similarly, each of measurement spots of the A-surface distance meter 2A and the B-surface distance meter 2B is mechanically adjusted so as to be positioned at the center of the second stage 5. Then, the conveyance unit 6 is adjusted such that the center of the wafer WA is clamped with the center of the wafer WA positioned at the center of the first stage 4 when the wafer WA is conveyed to the first stage 4, and the conveyance unit 6 is adjusted such that the wafer WA is clamped with the center of the wafer WA positioned at the center of the second stage 4 when the wafer WA is conveyed to the second stage 4. In the positioning in the rotation direction, a marking position of the wafer WA is detected by, for example, a camera (not illustrated) or the like, and the first stage 4 is driven such that the detected marking position is positioned at a previously set initial position. Similarly, the marking position of the wafer WA is detected by, for example, a camera (not illustrated), and the second stage 5 is driven such that the detected marking position is positioned at a previously set initial position. In a case where the wafer WA is, for example, a semiconductor wafer, when the wafer WA is 300 mm or more, a notched part, which is called a notch, representing the marking position is formed in the semiconductor wafer, and when the wafer WA is 200 mm or less, an ori-fla (orientation flat) indicating a crystal orientation of the wafer is formed in the semiconductor wafer, and the ori-fla can be used as the marking position.

After such positioning adjustment, when a command instructing to start measurement is received from, for example, the input unit 7, the wafer thickness measurement device S causes the stage conveyance control unit 32 of the operation control unit 3 to drive, in FIG. 5, the first stage 4 such that the measurement spots of the A-surface optical interferometer 1A and the B-surface optical interferometer 1B are positioned at a previously set reference measurement point MP0 of the wafer WA, and measures the reference measurement point MP0 with the A-surface optical interferometer 1A and the B-surface optical interferometer 1B (S1). As a result, the first and second interferometer reference measurement results are obtained.

Next, the wafer thickness measurement device S drives the first stage 4 by the stage conveyance control unit 32 such that the measurement spots of the A-surface optical interferometer 1A and the B-surface optical interferometer 1B are positioned at previously set measurement points MPK of the wafer WA, and measures the measurement points MPK with the A-surface optical interferometer 1A and the B-surface optical interferometer 1B (S2). As a result, the first and second interferometer measurement results are obtained.

More specifically, for example, in the present embodiment, the stage conveyance control unit 32 controls the linear drive unit 43 of the first stage 4 and moves the wafer WA in the linear direction while rotating the wafer WA by controlling the rotation drive unit 42 of the first stage 4. While controlling the first stage 4 by the stage conveyance control unit 32 as described above, the operation control unit 3 performs measurement with the A-surface optical interferometer 1A and the B-surface optical interferometer 1B every time the measurement spots of the A-surface optical interferometer 1A and the B-surface optical interferometer 1B are at one of predetermined positions (measurement points) MP that are previously set. By such an operation, the first and second interferometer measurement results are obtained at the measurement points MPK on the wafer WA such that a trajectory of the plurality of measurement points MPk draw a spiral. Alternatively, for example, the stage conveyance control unit 32 controls the rotation drive unit 42 of the first stage 4 and rotates the wafer WA, and, at the same time, the operation control unit 3 performs measurement with the A-surface optical interferometer 1A and the B-surface optical interferometer 1B every time the measurement spots of the A-surface optical interferometer 1A and the B-surface optical interferometer 1B are at one of predetermined positions (measurement points) MP that are previously set. Subsequently, when the wafer WA has made one rotation, the linear drive unit 43 of the first stage 4 is controlled so as to move the wafer WA in the linear direction by a predetermined distance. Then, when the wafer WA is moved by a predetermined distance in the linear direction, the operation control unit 3 rotates the wafer WA and, at the same time, performs measurement with the A-surface optical interferometer 1A and the B-surface optical interferometer 1B, in the same manner as described above. By such an operation, the first and second interferometer measurement results are obtained at the measurement points MPK at the positions on the circles having different radii.

The reference measurement point MP0 of the wafer WA may be appropriately set on the wafer WA, but the first measurement point MP1 of the measurement points MPK measured as described above may be the reference measurement point MP0 of the wafer WA. As a result, Process S1 and Process S2 can be smoothly and continuously performed.

Next, the wafer thickness measurement device S causes the stage conveyance control unit 32 to convey the wafer WA from the first stage 4 to the second stage 5 (S3).

Next, the wafer thickness measurement device S causes the stage conveyance control unit 32 to drives the second stage 5 such that the measurement spots of the A-surface distance meter 2A and the B-surface distance meter 2B are positioned at the reference measurement point MP0, and measures the reference measurement point MP0 by the A-surface distance meter 2A and the B-surface distance meter 2B (S4). As a result, the first and second distance meter reference measurement results are obtained.

Next, the wafer thickness measurement device S causes the stage conveyance control unit 32 to drives the second stage 4 such that the measurement spots of the A-surface distance meter 2A and the B-surface distance meter 2B are positioned at the measurement points MPK, and measures the measurement points MPK by the A-surface distance meter 2A and the B-surface distance meter 2B (S5). As a result, the first and second distance meter measurement results are obtained.

The wafer thickness measurement device S causes the thickness calculation unit 31 of the operation control unit 3 to obtain, based on: first and second interferometer reference measurement results obtained by measuring, in Process S1, the reference measurement point MP0 with the A-surface optical interferometer 1A and the B-surface optical interferometer 1B; first and second distance meter reference measurement results obtained by measuring, in Process S4, the reference measurement point MP0 with the A-surface distance meter 2A and the B-surface distance meter 2B; first and second interferometer measurement results of the measurement points MPk obtained by measuring, in Process S2, the measurement points MPK with the A-surface optical interferometer 1A and the B-surface optical interferometer 1B; and first and second distance meter measurement results of the measurement points MPK obtained by measuring, in Process S5, the measurement points MPk with the A-surface distance meter 2A and the B-surface distance meter 2B, numbers N of phases between a reference displacement Wiref obtained based on the first and second interferometer reference measurement results and displacements Wi obtained based on the first and second interferometer measurement results, and obtains thicknesses Tk, of the wafer WA, at the measurement points MPK (S6). In the present embodiment, the integers N that minimize Wm−Wmref−((Wi−Wiref)+N×(λ/2)) are obtained at respective ones of the measurement points MPK, and the thicknesses T of the wafer WA are obtained by ((Wi−Wiref)+N×(λ/2))+Wmref.

Then, the wafer thickness measurement device S outputs, to the output unit 8, the thicknesses Tk of the wafer WA at the measurement points MPK obtained in Process S6, and ends the processing (S7).

As described above, in the wafer thickness measurement device S according to the embodiment and the wafer thickness measurement method mounted on the wafer thickness measurement device S, the numbers N of phases between the reference displacement Wiref obtained based on the first and second interferometer reference measurement results and the displacements Wi obtained based on the first and second interferometer measurement results are obtained; therefore, the thicknesses T of the wafer WA can be obtained based on the measurement results of the A-surface optical interferometer 1A and the B-surface optical interferometer 1B, so that the thicknesses T of the wafer WA can be measured with high accuracy utilizing the performance of the optical interferometers. The wafer thickness measurement device S and the wafer thickness measurement method can measure the thickness of the wafer WA with an accuracy of several nanometers, for example. In the wafer thickness measurement device S and the wafer thickness measurement method, since only a single reference measurement point is required, an arbitrary member can be used as the reference piece.

In the wafer thickness measurement device S and the wafer thickness measurement method, the thickness T of the measurement target wafer WA at the measurement point MP can be obtained by ((Wi−Wiref)+N×(λ/2))+W0 using the A-surface optical interferometer 1A and the B-surface optical interferometer 1B, that is, the formula is ((Wi−Wiref)+N×(λ/2))+Wmref in the above-described example. Therefore, the thickness T of the wafer WA can be measured with high accuracy utilizing the performance of the optical interferometers.

Figure 6:
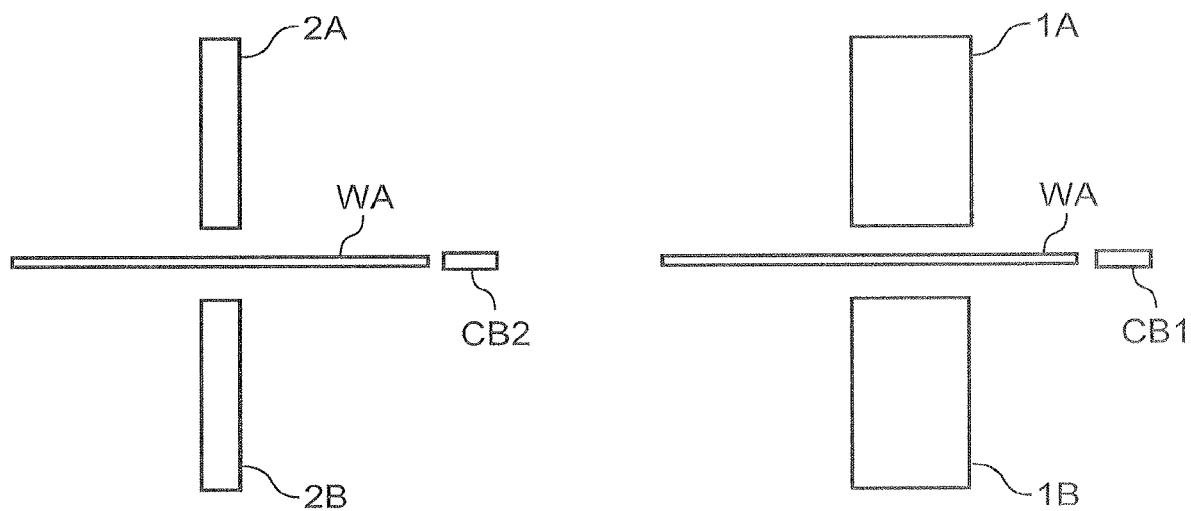
FIG. 6 is a diagram for describing a first modification of the wafer thickness measurement device.

However, in the above-described embodiment, as illustrated in FIG. 6, for example, the wafer thickness measurement device S may further include: a first calibration piece CB1 for calibrating the A-surface optical interferometer 1A and the B-surface optical interferometer 1B; and a second calibration piece C2 for calibrating the A-surface distance meter 2A and the B-surface distance meter 2B, and calibration may be performed with the first and second calibration pieces CB1 and CB2.

FIG. 6 is a diagram for describing a first modification of the wafer thickness measurement device. More specifically, in the wafer thickness measurement device S according to the first modification, appropriate members are prepared in advance as the first and second calibration pieces CB1 and CB2, the first calibration piece CB1 is disposed at a position where measurement can be performed by the A-surface optical interferometer 1A and the B-surface optical interferometer 1B, and the second calibration piece CB2 is disposed at a position where measurement can be performed by the A-surface distance meter 2A and the B-surface distance meter 2B. For example, the first calibration piece CB1 is attached to any one of the three arm members in the support portion 44 of the first stage 4 so as to be measurable by the A-surface optical interferometer 1A and the B-surface optical interferometer 1B. Similarly, the second calibration piece CB2 is attached to any one of the three arm members in the support portion of the second stage 4 so as to be measurable by the A-surface distance meter 2A and the B-surface distance meter 2B.

Then, the thickness calculation unit 31 obtains, based on: first and second interferometer reference calibration measurement results obtained by measuring, when calibrating the wafer thickness measurement device S, a first calibration point on the first calibration piece CB1 with the A-surface optical interferometer 1A and the B-surface optical interferometer 1B; first and second distance meter reference calibration measurement results obtained by measuring, when performing the calibration, a second calibration point on the second calibration piece CB2 with the A-surface distance meter 2A and the B-surface distance meter 2B; first and second interferometer calibration measurement results obtained by measuring, after the calibration and before measuring the thickness T of the measurement target wafer WA, the first calibration point with the A-surface optical interferometer 1A and the B-surface optical interferometer 1B; first and second distance meter calibration measurement results obtained by measuring, before performing the measurement, the second calibration point with the A-surface distance meter 2A and the B-surface distance meter 2B; and the first and second interferometer reference measurement results, the first and second distance meter reference measurement results, the first and second interferometer measurement results, and the first and second distance meter measurement results, the number N of phases, and obtains the thickness T of the measurement target wafer WA at the measurement point.

More specifically, when assuming: a reference calibration displacement obtained based on the first and second interferometer reference calibration measurement results is Wicref; a reference calibration thickness obtained based on the first and second distance meter reference calibration measurement results is Wmcref; a calibration displacement obtained based on the first and second interferometer calibration measurement results is Wic; and a calibration thickness obtained based on the first and second distance meter calibration measurement results is Wmc, the following Formula 8 holds similarly to the above-described Formula 5. Therefore, the number N of phases is obtained by obtaining an integer N that minimizes Wm−Wmref−(Wmc−Wmcref)−(((Wi−Wiref)+N×(λ/2)−(Wic−Wicref))), so that the thickness T of the measurement target wafer WA at the measurement point MP is obtained by the following Formula 9. Alternatively, the thickness T of the measurement target wafer WA at the measurement point MP may be obtained by the following Formula 10.

$$|\varepsilon| = Wm - Wmref - (Wmc - Wmcref) - \quad \text{Formula 8}$$
$$((Wi - Wiref) + N \times (\lambda/2) - (Wic - Wicref))$$
$$T = ((Wi - Wiref) + N \times (\lambda/2) - (Wic - Wicref)) + W0 \quad \text{Formula 9}$$
$$T = ((Wi - Wiref) + N \times (\lambda/2) - (Wic - Wicref)) + Wmref \quad \text{Formula 10}$$

In such a wafer thickness measurement device S, at the time of calibration, that is, for example, at the shipment stage or before start of measurement after delivery, by the manufacturer or a user, the first and second interferometer reference calibration measurement results are obtained by measuring the first calibration point on the first calibration piece CB1 with the A-surface optical interferometer 1A and the B-surface optical interferometer 1B, the first and second distance meter reference calibration measurement results are obtained by measuring the second calibration point on the second calibration piece CB2 with the A-surface distance meter 2A and the B-surface distance meter 2B, and the first and second interferometer reference calibration measurement results and the first and second distance meter reference calibration measurement results are stored in the operation control unit 3.

Then, at the time of measurement, before Process S1 described above with reference to FIG. 5, the first stage 4 is driven such that the measurement spots of the A-surface optical interferometer 1A and the B-surface optical interferometer 1B are positioned at the first calibration point, and the process of measuring the first calibration point with the A-surface optical interferometer 1A and the B-surface optical interferometer 1B is performed. As a result, the first and second interferometer calibration measurement results are obtained. Subsequently, the processes of Process S1 to Process S3 described above with reference to FIG. 5 are sequentially performed. Subsequently, before Process S4 described above with reference to FIG. 5, the second stage 5 is driven such that the measurement spots of the A-surface distance meter 2A and the B-surface distance meter 2B are positioned at the second calibration point, and the process of measuring the second calibration point with the A-surface distance meter 2A and the B-surface distance meter 2B is performed. As a result, the first and second distance meter calibration measurement results are obtained. Subsequently, the processes of Process S4 to Process S6 described above with reference to FIG. 5 are sequentially performed. In this Process S6, the thickness calculation unit 31 obtains, as the number N of phases, the integer N that minimizes Wm−Wmref−(Wmc−Wmcref)−((Wi−Wiref)+N×(λ/2)−(Wic−Wicref)), and obtains the thickness T of the wafer WA at the measurement point MP by ((Wi−Wiref)+N×(λ/2)−(Wic−Wicref))+Wmref. Then, Process S7 described above with reference to FIG. 5 is performed, and the measurement is ended.

Such a wafer thickness measurement device S and wafer thickness measurement method can be calibrated with the first and second calibration pieces CB1 and CB2, and even when a drift (shift) occurs in the measurement result due to, for example, a secular change of the A-surface optical interferometer 1A and the B-surface optical interferometer 1B or the A-surface distance meter 2A and the B-surface distance meter 2B, the thickness T of the wafer WA can be obtained with the drift (shift) corrected (adjusted). In the wafer thickness measurement device S and the wafer thickness measurement method, the corrected thickness T of the wafer WA can be obtained by ((Wi−Wiref)+N×(λ/2)−(Wic−Wicref))+W0, and can be obtained, in the above-described example, by ((Wi−Wiref)+N×(λ/2)−(Wic−Wicref))+Wmref.

Furthermore, in the above-described embodiment, the wafer thickness measurement device S includes: the first stage 4 for the A-surface optical interferometer 1A and the B-surface optical interferometer 1B; the second stage 5 for the A-surface distance meter 2A and the B-surface distance meter 2B; and the conveyance unit 6 for conveying the wafer WA between the first and second stages 4 and 5. However, the first and second stages 4 and 5 may be combined into a single stage for the A-surface optical interferometer 1A and the B-surface optical interferometer 1B and for the A-surface distance meter 2A and the B-surface distance meter 2B. With this configuration, the second stage 5 and the conveyance unit 6 can be omitted, and the positioning of the second stage 5 can also be omitted.

Figure 7:
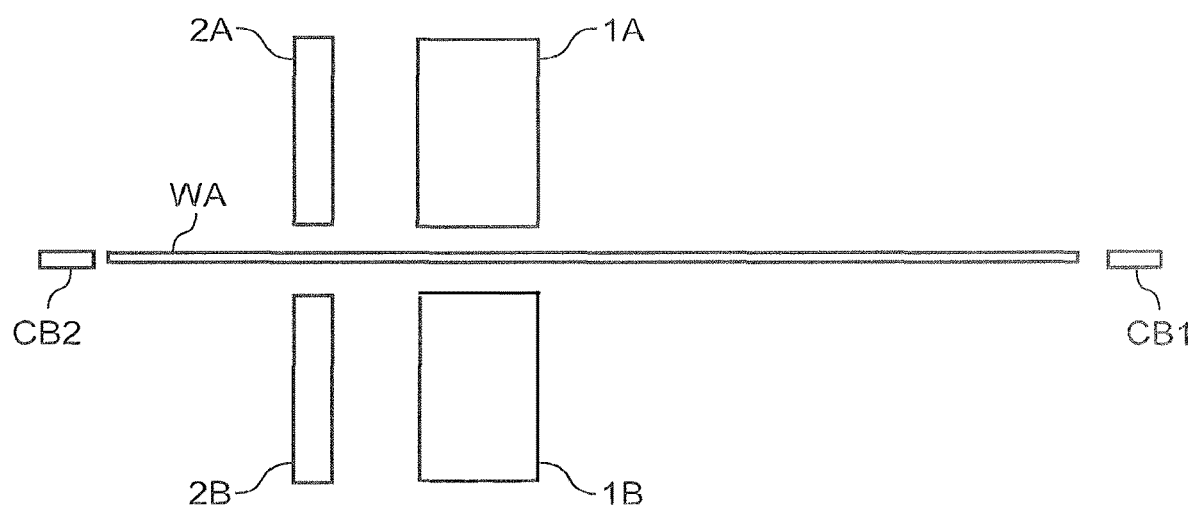
FIG. 7 is a diagram for describing a second modification of the wafer thickness measurement device.

FIG. 7 is a diagram for explaining a second modification of the wafer thickness measurement device. In such a wafer thickness measurement device S according to the second modification, more specifically, as illustrated in FIG. 7, for example, the A-surface optical interferometer 1A and the B-surface optical interferometer 1B and the A-surface distance meter 2A and the B-surface distance meter 2B are disposed such that the measurement spots of the A-surface optical interferometer 1A and the B-surface optical interferometer 1B are positioned on the wafer WA placed on a stage (not illustrated), and, at the same time, the measurement spots of the A-surface distance meter 2A and the B-surface distance meter 2B are positioned on the wafer WA. The stage (not illustrated) has, for example, the same configuration as the first stage 4 illustrated in FIG. 2. Then, a positional relation between the positions of the measurement spots of the A-surface optical interferometer 1A and the B-surface optical interferometer 1B and the positions of the measurement spots of the A-surface distance meter 2A and the B-surface distance meter 2B is stored in the operation control unit 3. The operation control unit 3 drives, based on the positional relation, the stage (not illustrated) such that the measurement points measured by the A-surface distance meter 2A and the B-surface distance meter 2B coincide with the measurement points measured by the A-surface distance meter 2A and the B-surface distance meter 2B.

As illustrated in FIG. 7, the first and second calibration pieces CB1 and CB2 may be used, and In this case, for example, the first calibration piece CB1 is attached to any one of the three arm members in the support portion of the stage (not illustrated) so as to be measurable by the A-surface optical interferometer 1A and the B-surface optical interferometer 1B, and the second calibration piece CB2 is attached to any other one of the three arm members in the support portion of the stage (not illustrated) so as to be measurable by the A-surface distance meter 2A and the B-surface distance meter 2B.

The present specification discloses various aspects of techniques as described above, and the main techniques of the disclosed aspects are summarized below.

A wafer thickness measurement device according to one aspect includes: a pair of first and second optical interferometers disposed to face each other with a measurement target wafer interposed between the first and second optical interferometers; a pair of first and second distance meters that are disposed to face each other with the measurement target wafer interposed between the first and second distance meters and that measure absolute distances; and a thickness calculation unit that obtains, based on: first and second interferometer reference measurement results obtained by measuring, with the first and second optical interferometers, a reference measurement point on a reference piece having the reference measurement point at which the reference piece has a known thickness; first and second distance meter reference measurement results obtained by measuring the reference measurement point with the first and second distance meters; first and second interferometer measurement results obtained by measuring a measurement point on the measurement target wafer with the first and second optical interferometers; and first and second distance meter measurement results obtained by measuring the measurement point with the first and second distance meters, a number of phases between a reference displacement obtained based on the first and second interferometer reference measurement results and a displacement obtained based on the first and second interferometer measurement results, and obtains a thickness, of the measurement target wafer, at the measurement point.

Such a wafer thickness measurement device obtains the number of phases between the reference displacement obtained based on the first and second interferometer reference measurement results and the displacement obtained based on the first and second interferometer measurement results; therefore, the thickness of the wafer can be obtained based on the measurement results obtained by the first and second optical interferometers. Therefore, the thickness of the wafer can be measured with high accuracy utilizing the performance of the optical interferometers. In the wafer thickness measurement device, since only a single reference measurement point is required, an arbitrary member can be used as the reference piece.

In another aspect, in the above-described wafer thickness measurement device, when assuming: the known thickness is W0; the number of phases is an integer N; a wavelength of measurement light in the first and second optical interferometers is $\lambda$; the reference displacement obtained based on the first and second interferometer reference measurement results is Wiref; a reference thickness obtained based on the first and second distance meter reference measurement results is Wmref; the displacement obtained based on the first and second interferometer measurement results is Wi; and a thickness obtained based on the first and second distance meter measurement results is Wm, the thickness calculation unit obtains a number N of phases by obtaining an integer N that minimizes Wm−Wmref−((Wi−Wiref)+N×($\lambda$/2)), and obtains the thickness, of the measurement target wafer, at the measurement point by ((Wi−Wiref)+N×($\lambda$/2))+W0. Preferably, in the above-described wafer thickness measurement device, the reference piece is the measurement target wafer, the reference measurement point is a predetermined point on the measurement target wafer, the known thickness W0 is the reference thickness Wmref, and the thickness calculation unit obtains the thickness, of the measurement target wafer, at the measurement point by ((Wi−Wiref)+N×($\lambda$/2))+Wmref.

Such a wafer thickness measurement device can obtain the thickness, of the measurement target wafer, at the measurement point by ((Wi−Wiref)+N×($\lambda$/2))+W0 using the measurement results in the first and second optical interferometers, the thickness of the wafer can be measured with high accuracy utilizing the performance of the optical interferometers.

In another aspect, in the above-described wafer thickness measurement device, the thickness calculation unit obtains the number of phases based on: first and second interferometer reference calibration measurement results obtained by measuring, when calibrating the wafer thickness measurement device, a predetermined first calibration point on a predetermined first calibration piece with the first and second optical interferometers; first and second distance meter reference calibration measurement results obtained by measuring, when performing the calibration, a predetermined second calibration point on a predetermined second calibration piece with the first and second distance meters; first and second interferometer calibration measurement results obtained by measuring, after the calibration and before measuring a thickness of the measurement target wafer, the first calibration point with the first and second optical interferometers; first and second distance meter calibration measurement results obtained by measuring, before performing the measurement, the second calibration point with the first and second distance meters; and the first and second interferometer reference measurement results, the first and second distance meter reference measurement results, the first and second interferometer measurement results, and the first and second distance meter measurement results, and obtains the thickness, of the measurement target wafer, at the measurement point.

Such a wafer thickness measurement device can be calibrated with a calibration pieces, and even when a drift (shift) occurs in the measurement result due to, for example, a secular change of the first and second optical interferometers and the first and second distance meters, the thickness of the wafer can be obtained with the drift (shift) corrected (adjusted).

In another aspect, in the above-described wafer thickness measurement device, when assuming: the known thickness is W0; the number of phases is an integer N; a wavelength of measurement light in the first and second optical interferometers is $\lambda$; a reference calibration displacement obtained based on the first and second interferometer reference calibration measurement results is Wicref; a reference calibration thickness obtained based on the first and second distance meter reference calibration measurement results is Wmcref; a calibration displacement obtained based on the first and second interferometer calibration measurement results is Wic; a calibration thickness obtained based on the first and second distance meter calibration measurement results is Wmc; the reference displacement obtained based on the first and second interferometer reference measurement results is Wiref; a reference thickness obtained based on the first and second distance meter reference measurement results is Wmref; the displacement obtained based on the first and second interferometer measurement results is Wi; and a thickness obtained based on the first and second distance meter measurement results is Wm, the thickness calculation unit obtains a number of phases by obtaining an integer N that minimizes Wm−Wmref−(Wmc−Wmcref)−((Wi−Wiref)+N×($\lambda$/2)−(Wic−Wicref)), and obtains the thickness, of the measurement target wafer, at the measurement point by ((Wi−Wiref)+N×($\lambda$/2)−(Wic−Wicref))+W0. Preferably, in the above-described wafer thickness measurement device, the reference piece is the measurement target wafer, the reference measurement point is a predetermined point on the measurement target wafer, the known thickness W0 is the reference thickness Wmref, and the thickness calculation unit obtains the thickness, of the measurement target wafer, at the measurement point by ((Wi−Wiref)+N×($\lambda$/2)−(Wic−Wicref))+Wmref.

Such a wafer thickness measurement device, the corrected thickness can be obtained by ((Wi−Wiref)+N×($\lambda$/2)−(Wic−Wicref))+W0.

A wafer thickness measurement method according to another aspect of the present invention includes: an interferometer reference measurement step of acquiring first and second interferometer reference measurement results by measuring, with a pair of first and second optical interferometers dispose to face each other with a measurement target wafer interposed between the first and second optical interferometers, a reference measurement point on a reference piece having the reference measurement point at which the reference piece has a known thickness; a distance meter reference measurement step of acquiring first and second distance meter reference measurement results by measuring the reference measurement point with a pair of first and second distance meters that are disposed to face each other with the measurement target wafer interposed between the first and second distance meters and that measure absolute distances; an interferometer measurement step of acquiring first and second interferometer measurement results by measuring the measurement point on the measurement target wafer with the first and second optical interferometers; a distance meter measurement step of acquiring first and second distance meter measurement results by measuring the measurement point with the first and second distance meters; and a thickness calculation step of obtaining, based on: the first and second interferometer reference measurement results acquired in the interferometer reference measurement step; the first and second distance meter reference measurement results acquired in the distance meter reference measurement step; the first and second interferometer measurement results acquired in the interferometer measurement step; and the first and second distance meter measurement results acquired in the distance meter measurement step, a number of phases between a reference displacement obtained based on the first and second interferometer reference measurement results and a displacement obtained based on the first and second interferometer measurement results, and obtaining a thickness, of the measurement target wafer, at the measurement point.

Such a wafer thickness measurement method obtains the number of phases between the reference displacement obtained based on the first and second interferometer reference measurement results and the displacement obtained based on the first and second interferometer measurement results; therefore, the thickness of the wafer can be obtained based on the measurement results obtained by the first and second optical interferometers. Therefore, the thickness of the wafer can be measured with high accuracy utilizing the performance of the optical interferometers. In the wafer thickness measurement method, since only a single reference measurement point is required, an arbitrary member can be used as the reference piece.

This application is based on Japanese Patent Application No. 2021-183242 filed on Nov. 10, 2021, the content of which is included in the present application.

Although the present invention has been appropriately and sufficiently described through the embodiments with reference to the above drawings to express the present invention, it should be recognized that a person skilled in the art can easily modify and/or improve the above-described embodiments.

Therefore, unless a modification or improvement made by a person skilled in the art is at a level departing from the scope of rights of the claims described in the claims, the modification or improvement is interpreted to be included in the scope of rights of the claims.

INDUSTRIAL APPLICABILITY

According to the present invention, it is possible to provide a wafer thickness measurement device and a wafer thickness measurement method for measuring the thickness of a wafer.

The invention claimed is:

1. A wafer thickness measurement device comprising:
a pair of first and second optical interferometers disposed to face each other with a measurement target wafer interposed between the first and second optical interferometers;
a pair of first and second distance meters that are disposed to face each other with the measurement target wafer interposed between the first and second distance meters and that measure absolute distances; and
a thickness calculation unit that obtains, based on: first and second interferometer reference measurement results obtained by measuring, with the first and second optical interferometers, a reference measurement point on a reference piece having the reference measurement point at which the reference piece has a known thickness; first and second distance meter reference measurement results obtained by measuring the reference measurement point with the first and second distance meters; first and second interferometer measurement results obtained by measuring a measurement point on the measurement target wafer with the first and second optical interferometers; and first and second distance meter measurement results obtained by measuring the measurement point with the first and second distance meters, a number of phases between a reference displacement obtained based on the first and second interferometer reference measurement results and a displacement obtained based on the first and second interferometer measurement results, and obtains a thickness, of the measurement target wafer, at the measurement point.

2. The wafer thickness measurement device according to claim 1, wherein, when assuming: the known thickness is W0; the number of phases is an integer N; a wavelength of measurement light in the first and second optical interferometers is $\lambda$; the reference displacement obtained based on the first and second interferometer reference measurement results is Wiref; a reference thickness obtained based on the first and second distance meter reference measurement results is Wmref; the displacement obtained based on the first and second interferometer measurement results is Wi; and a thickness obtained based on the first and second distance meter measurement results is Wm, the thickness calculation unit obtains a number N of phases by obtaining an integer N that minimizes Wm−Wmref−((Wi−Wiref)+N×($\lambda$/2)), and obtains the thickness, of the measurement target wafer, at the measurement point by ((Wi−Wiref)+N×($\lambda$/2))+W0.

3. The wafer thickness measurement device according to claim 1, wherein the thickness calculation unit obtains the number of phases based on: first and second interferometer reference calibration measurement results obtained by measuring, when calibrating the wafer thickness measurement device, a predetermined first calibration point on a predetermined first calibration piece with the first and second optical interferometers; first and second distance meter reference calibration measurement results obtained by measuring, when performing the calibration, a predetermined second calibration point on a predetermined second calibration piece with the first and second distance meters; first and second interferometer calibration measurement results obtained by measuring, after the calibration and before measuring a thickness of the measurement target wafer, the first calibration point with the first and second optical interferometers; first and second distance meter calibration measurement results obtained by measuring, before performing the measurement, the second calibration point with the first and second distance meters; and the first and second interferometer reference measurement results, the first and second distance meter reference measurement results, the first and second interferometer measurement results, and the first and second distance meter measurement results, and obtains the thickness, of the measurement target wafer, at the measurement point.

4. The wafer thickness measurement device according to claim 3, wherein, when assuming: the known thickness is W0; the number of phases is an integer N; a wavelength of measurement light in the first and second optical interferometers is $\lambda$; a reference calibration displacement obtained based on the first and second interferometer reference calibration measurement results is Wicref; a reference calibration thickness obtained based on the first and second distance meter reference calibration measurement results is Wmcref; a calibration displacement obtained based on the first and second interferometer calibration measurement results is Wic; a calibration thickness obtained based on the first and second distance meter calibration measurement results is Wmc; the reference displacement obtained based on the first and second interferometer reference measurement results is Wiref; a reference thickness obtained based on the first and second distance meter reference measurement results is Wmref; the displacement obtained based on the first and second interferometer measurement results is Wi; and a thickness obtained based on the first and second distance meter measurement results is Wm, the thickness calculation unit obtains a number of phases by obtaining an integer N that minimizes Wm−Wmref−(Wmc−Wmcref)−((Wi−Wiref)+N×($\lambda$/2)−(Wic−Wicref)), and obtains the thickness, of the measurement target wafer, at the measurement point by ((Wi−Wiref)+N×($\lambda$/2)−(Wic−Wicref))+W0.

5. A wafer thickness measurement method comprising:
an interferometer reference measurement step of acquiring first and second interferometer reference measurement results by measuring, with a pair of first and second optical interferometers dispose to face each other with a measurement target wafer interposed between the first and second optical interferometers, a reference measurement point on a reference piece having the reference measurement point at which the reference piece has a known thickness;

a distance meter reference measurement step of acquiring first and second distance meter reference measurement results by measuring the reference measurement point with a pair of first and second distance meters that are disposed to face each other with the measurement target wafer interposed between the first and second distance meters and that measure absolute distances;

an interferometer measurement step of acquiring first and second interferometer measurement results by measuring the measurement point on the measurement target wafer with the first and second optical interferometers;

a distance meter measurement step of acquiring first and second distance meter measurement results by measuring the measurement point with the first and second distance meters; and a thickness calculation step of obtaining, based on: the first and second interferometer reference measurement results acquired in the interferometer reference measurement step; the first and second distance meter reference measurement results acquired in the distance meter reference measurement step; the first and second interferometer measurement results acquired in the interferometer measurement step; and the first and second distance meter measurement results acquired in the distance meter measurement step, a number of phases between a reference displacement obtained based on the first and second interferometer reference measurement results and a displacement obtained based on the first and second interferometer measurement results, and obtaining a thickness, of the measurement target wafer, at the measurement point.

* * * * *